(12) United States Patent
Knapp et al.

(10) Patent No.: US 6,874,048 B2
(45) Date of Patent: Mar. 29, 2005

(54) COMMUNICATION SYSTEM AND METHODOLOGY FOR SENDING A DESIGNATOR FOR AT LEAST ONE OF A SET OF TIME-DIVISION MULTIPLEXED CHANNELS FORWARDED ACROSS A LOCALLY SYNCHRONIZED BUS

(75) Inventors: David J. Knapp, Austin, TX (US); Horace C. Ho, Austin, TX (US)

(73) Assignee: Oasis Silicon Systems, Inc., Austin, TX (US)

( * ) Notice: Subject to any disclaimer, the term of this patent is extended or adjusted under 35 U.S.C. 154(b) by 496 days.

(21) Appl. No.: 10/157,673

(22) Filed: May 29, 2002

(65) Prior Publication Data

US 2003/0225951 A1 Dec. 4, 2003

(51) Int. Cl.[7] .................. G06F 13/42; H04L 12/64; H04L 12/40
(52) U.S. Cl. .................. 710/105; 370/345; 370/468; 370/912; 340/825.2; 709/251
(58) Field of Search .................. 710/105, 61, 72, 710/117; 370/252, 254, 258, 345, 406, 509, 468, 912, 276, 404; 340/825.2; 375/254–356; 455/343.1; 709/251, 223, 248; 712/32; 361/737

(56) References Cited

U.S. PATENT DOCUMENTS

| 4,593,282 A | | 6/1986 | Acampora et al. | |
|---|---|---|---|---|
| 4,637,014 A | | 1/1987 | Bell et al. | |
| 5,406,559 A | * | 4/1995 | Edem et al. | 370/516 |
| 5,440,556 A | * | 8/1995 | Edem et al. | 370/465 |
| 5,506,846 A | * | 4/1996 | Edem et al. | 370/396 |
| 5,550,802 A | | 8/1996 | Worsley et al. | |
| 6,085,270 A | | 7/2000 | Gulick | |

FOREIGN PATENT DOCUMENTS

| EP | 0 178 205 | 4/1986 |
|---|---|---|
| EP | 8 883 263 | 12/1998 |
| WO | 02/13461 | 2/2002 |

OTHER PUBLICATIONS

"High–quality audio and video signal transmission in a broadband ISDN based on ATD–the problem of cell losses" by Hessenmuller, H.; Nunes, S. (abstract only) Publication Date: Sep. 3–6, 1990.*

"High speed GaAs 32×8 embeddable dual port SRAM register array for 200 Mbyte/s packet switching applications" by Lowe, K (abstract only) Publication Date: Apr. 14, 1990.*

International Search Report, application No. PCT/USO3/11601, mailed Feb. 25, 2004.

* cited by examiner

*Primary Examiner*—Gopal C. Ray
(74) *Attorney, Agent, or Firm*—Kevin L. Daffer; Daffer McDaniel, LLP

(57) ABSTRACT

A communication system, network interface and communication port is provided that includes a media local bus. The local bus is connected between a controller and one or more multimedia devices located within a node of the communication system. The controller periodically broadcasts sync signals to the source device, or devices, to synchronize data transmission partitioned into time slots. Each time slot represents is dedicated to a particular data type. Thus, time slot 1 can accommodate packetized data, time slot 2 can accommodate synchronous data, time slot 3 can accommodate control data, and time slot 4 can accommodate isochronous data. Various combinations and variations of those time slots can occur where fewer than four data types can be present within a frame or all four data types can be present. The local bus includes a signal line and one or more data lines.

31 Claims, 9 Drawing Sheets

| CH ADR. | SOURCE / DEST |
|---|---|
| A | CNT / DEV0 |
| B | DEV1 / DEV2 |
| C | DEV0 / DEV1 |
| . | . |
| . | . |
| . | . |

*FIG. 13*

ADDRESS

```
OXFF - 255    SYNC
OXFE - 254  ⎫
            ⎬ RES
            ⎭
OX80 - 128  ⎫
OX7F - 127  ⎬
            ⎬ CH ADR.
OX01 - 1    ⎭
OX00 -       RES
```

COMMAND

```
OXFF - 255  ⎫
            ⎬ RES
OX80 - 128  ⎭
OX7F - 127     ERROR
OX7E - 126     RESET
OX7D - 125     ECHO
OX7C        ⎫
OX0A        ⎬ RES
OX09        ⎭ CON  CNTL  PK
OX08           ST   CNTL  PK
OX07           CON  PKT   PK
OX06           ST   PKT   PK
OX05           CON  ISO   PK
OX04           ST   ISO   PK
OX03           CON  SYC   PK
OX02           ST   SYC   PK
OX01                RES
OX00                NO DATA
```

*FIG. 14*

COMMUNICATION SYSTEM AND METHODOLOGY FOR SENDING A DESIGNATOR FOR AT LEAST ONE OF A SET OF TIME-DIVISION MULTIPLEXED CHANNELS FORWARDED ACROSS A LOCALLY SYNCHRONIZED BUS

BACKGROUND OF THE INVENTION

1. Field of the Invention

This invention relates to a communication system, and more particularly to a bus that is time shared between a group of multimedia devices locally connected to the bus and communicable to a network coupled to the local bus by a network interface unit.

2. Description of the Related Art

Communication systems are generally well-known as containing at least two nodes interconnected by a transmission line. A node can function as a data source or destination. If the node is to receive and transmit data, then the node is a combination of a source and destination, and is sometimes known as a transceiver. The data source can transmit data in various forms. For example, the source can transmit in either an analog or digital domain. Typically, however, an analog signal is converted to a digital format before being transmitted across the transmission line to the destination.

It is generally desirable that the transmission line accommodate not only digital or analog data, but also data that can arrive in different forms, hereinafter known as "data types." For example, sophisticated transmission protocols can accommodate streaming data, packetized data, and control data. Streaming data is generally recognized as data that has a temporal relationship between samples produced from a node. The relationship between those samples must be maintained across the transmission line to prevent perceptible errors, such as gaps or altered frequencies. A loss in the temporal relationship can cause a receiver to present jitter, echo or, in the worst instance, periodic blanks in a voice or video stream. Converse to streaming data, packetized data is data which need not maintain the sample rate or temporal relationship of that data and, instead, can be sent as disjointed bursts across a transmission line. The packets of data can be sent across the transmission line at virtually any rate at which that transmission line transfers data and is not dependent in any fashion on any sampling frequency since packetized data is generally recognized as non-sampled data.

In addition to streaming data and packetized data, another type of data can be control data. Depending on how the control data is used (either in a streaming or packetized environment), control data may be either time dependent or non-time dependent on the data or node in which it controls. Moreover, streaming data can be considered as either synchronous data or isochronous data. Synchronous forms of streaming data is data sent across the transmission line in sync with the rate by which the streaming data is sampled. However, it may be that the transmission line transfers data at a different rate than the rate at which the node streams, or "samples," data. In order to maintain the temporal relationship between samples of the streaming data, isochronous transfer protocols are needed to accommodate those differences in order for the isochronous data to be played at the destination without perceptible gaps, errors, jitter or echo.

An optimal transmission line can transfer different types of data. Coupled to the transmission line, which can be either copper wire, optical fiber, or wireless, are multiple nodes. Each node can accommodate at least one multimedia device. For example, a telephone multimedia device can be used to send and receive voice information and, depending on differences in sampling rate (i.e., "fs") at the telephone and the frame transfer rate (i.e., "FSY") within the transmission line, the voice information can be either sent as isochronous data or synchronous data. Depending on the relationship between the frame sync rate (FSY) and the sampling rate (fs), streaming data can be presented to the transmission line as either synchronous data or isochronous data. In any instance, control information can be sent to the multimedia device to set up the transmission or to control the receipt of the streaming (isochronous or synchronous) data. In addition to transmitting streaming and control data, the transmission line should also be able to transmit packet information between computers. Packetized data includes executable programs and/or files sent as bursts of digital data across the transmission line.

Multimedia devices operating as sources can therefore produce not only different types of data in different forms, but also data that will arrive at the transmission line at different rates. For example, a voice from a telephone handset is a continuous stream of data having a substantially constant average data rate and a temporal relationship between the samples produced. The isochronous or synchronous forms of streaming data can, therefore, represent sounds (in the example of a telephone or CD player) or images (in the example of DVD player). While telephones, CD players and DVD players send isochronous or synchronous streaming data across a network, a computer sends bursts of packets such as in TCP/IP form across the network.

A communication system is needed that can accommodate both streaming and non-streaming data transfers between nodes of the communication system. More importantly, it is desirable that all forms of streaming data be accommodated, including synchronous streaming data and isochronous streaming data. Therefore, the desired transmission protocol should be particularly attuned to communication between multimedia devices that send data and receive data in whatever form data is needed to communicate information. It is further desirable that the communication system have intelligent nodes. That is, each node should be set up to accommodate one or more multimedia devices, where communication across the network is established within the intelligence of a controller possibly contained within each node. In this fashion, the desired communication system allows the intelligent controller to perform a significant portion of all transfer protocol operations across the network as well as between multimedia devices within a node connected via the controller, or network interface, to the network. In this fashion, an improvement can exist which will allow conventional multimedia devices to be easily added and the network to be easily scaled to the added devices without having to change or modify either the network or the devices.

SUMMARY OF THE INVENTION

The problems outlined above are in large part solved by an improved communication system hereof. The communication system involves not only the network that extends between nodes, but can also include a local bus within a node. The local bus can connect one or more multimedia devices to a controller within a node. The controller preferably operates as a network interface and connects the network to the local bus, which then allows communication between any of such devices connected to the local bus not only to one another, but also to other multimedia devices possibly contained in other nodes.

A feature of the local bus is the network interface operating as a controller. The controller serves many functions, one of which is to establish time slots dedicated to sending multiple channels of information across the local bus. Multiple time slots preferably correspond to each frame of data. Thus, each frame of data sent across the network is preferably partitioned into time slots that are decoded by the controller and forwarded to the appropriate multimedia device. In this fashion, one time-division multiplexed channel can be dedicated to isochronous data, another channel to synchronous data, yet another channel to packetized data, and a yet another channel to control data. Up to, for example, four time-division time slots can be created for each frame so that all four data types can be sent within a frame across not only the network, but also the local bus.

Depending on how each multimedia device on the local bus is configured, various time slots can be distributed to corresponding multimedia devices within each node. For example, during initialization, the first device can be set up to transmit/receive the first time slot, the second device can be set up to transmit/receive the second time slot, and so forth. The first device may, therefore, be one which handles isochronous data, and the second device can be one which handles synchronous data, and so forth for all the different data types that can be sent within a frame.

The intelligent controller within the network interface sends a sync signal at the beginning of each frame. The sync signal can be either a single pulse or multiple pulses that form a byte. The sync signal partitions of each frame and thereby synchronizes the various time slots attributable to each frame. The sync signal also identifies byte boundaries on the signal line and the data lines. The sync signal is coded as a unique command sent on the signal line from the controller to each of the multimedia devices connected to the local bus. If the local bus topology is a ring, the sync signal can be retransmitted by each device in order to maintain synchronization of channels (i.e., frame and byte synchronization) forwarded about the ring.

If synchronous or isochronous data is sent in each frame, it is known that each succeeding frame will take up where the preceding frame left off. Thus, a time slot dedicated to isochronous data within frame N+1 will resume where the same time slot dedicated to isochronous data within frame N ended. Packetized data does not carry this inherent form of bookmark since the packets do not carry a temporal relationship to one another. Thus, a command signal must be sent on the signal line subsequent to each sync byte in order to note where, within a packet of data being sent, the current time slot exists within that packet. The command signal will indicate either the start of a packet of non-streaming data or a continuation of the current packet sent in a previous frame.

The sync signal and command signal sent on a single signal line are preferably bytes which can be easily decoded separate from one another such that even if the sync byte is sent immediately preceding a command byte, the code of the sync byte is quickly decoded separate and apart from the command byte. Advantageously, the sync byte can be a hexadecimal FF code and the command byte can be a 0XXX XXXX binary code (or a 0X hex code). The command byte is, therefore, any byte on the signal line having an MSB of 0. The MSB of 0 guarantees that the unique pattern of eight 1s followed by one 0 occurs only during a sync. Thus, each sync byte can be quickly decoded to signify the beginning of a frame whenever eight logic 1 values are followed by a logic 0 voltage value.

According to one embodiment, a communication port or network interface is provided. The port can be found within the network interface and/or on within one or more multimedia devices, and comprises a data pin adapted to send and/or receive a frame comprising a first set of bytes time-division multiplexed in a different field of bytes from a second set of bytes, and wherein the first set of bytes comprises packet data. The port or network interface also includes a signal pin adapted to send and/or receive a sync signal followed by a command signal, wherein the sync signal indicates a boundary for bytes and frames, and the command signal occurs at approximately the same time as the first set of bytes for indicating a start of the packet data. The start of the packet data connotes that multiple bytes within a packet can be sent across multiple frames and, therefore, the command signal notes where the packet is within the series of packets being transmitted.

According to yet another embodiment, a communication system is provided. The communication system includes a network interface and a multimedia device. The network interface comprises a data pin and a signal pin. The data pin is configured to send a frame of data partitioned according to time slots, and the signal pin is configured to send a sync signal followed by a command signal. The sync signal and command signals can each be one byte long, and are coded. The multimedia device also includes a data pin and a signal pin. The data pin on the multimedia device is configured to receive the frame of data and the signal pin is coupled to a decoder for receiving the sync code and the command code. The decoder of the multimedia device decodes the sync code to signify the beginning of the frame and also decodes the command code to signify the beginning of the data type within one of the data partitions that is dissimilar from a data type within another one of the data partitions. Preferably, the decoder decodes the command code to signify where, within a packet, the packet exists (i.e., whether the packet is at the beginning or near the end within a particular frame).

According to yet another embodiment, a method is provided for transmitting data. The method includes receiving a frame of data sent from a network of interconnected multimedia devices and thereafter partitioning the frame of data into time slots. The partitioned time slots of data are then forwarded into respective plurality of channels selected according to time-division multiplexing. The start of the first channel is signaled within the plurality of channels, with a start of packet byte to indicate the beginning of a packet of data placed within the channel and, importantly, to signify the position of a packet of data placed within a particular time slot of a particular byte. If the command indicates the beginning of a packet, the succeeding frame will have a time slot dedicated to transferring the next portion of the packet, and so forth, until the entire packet is transmitted.

BRIEF DESCRIPTION OF THE DRAWING

Other objects and advantages of the invention will become apparent upon reading the following detailed description and upon reference to the accompanying drawings in which:

FIG. 13 is a table of channel addresses and corresponding sources and destinations for each channel address in the example shown in FIGS. 11 and 12; and FIG. 14 is a table of a plurality of channel addresses that are set aside and usable by the controller to establish unique channels across the local bus and a plurality of commands that can be sent by the controller or a device applicable to initializing addressing, to notify the destination device of an error in transmission, to notify the destination device of no data within a channel, and/or to notify the destination device that the data being transmitted across a channel is of a certain type.

Figure 1:
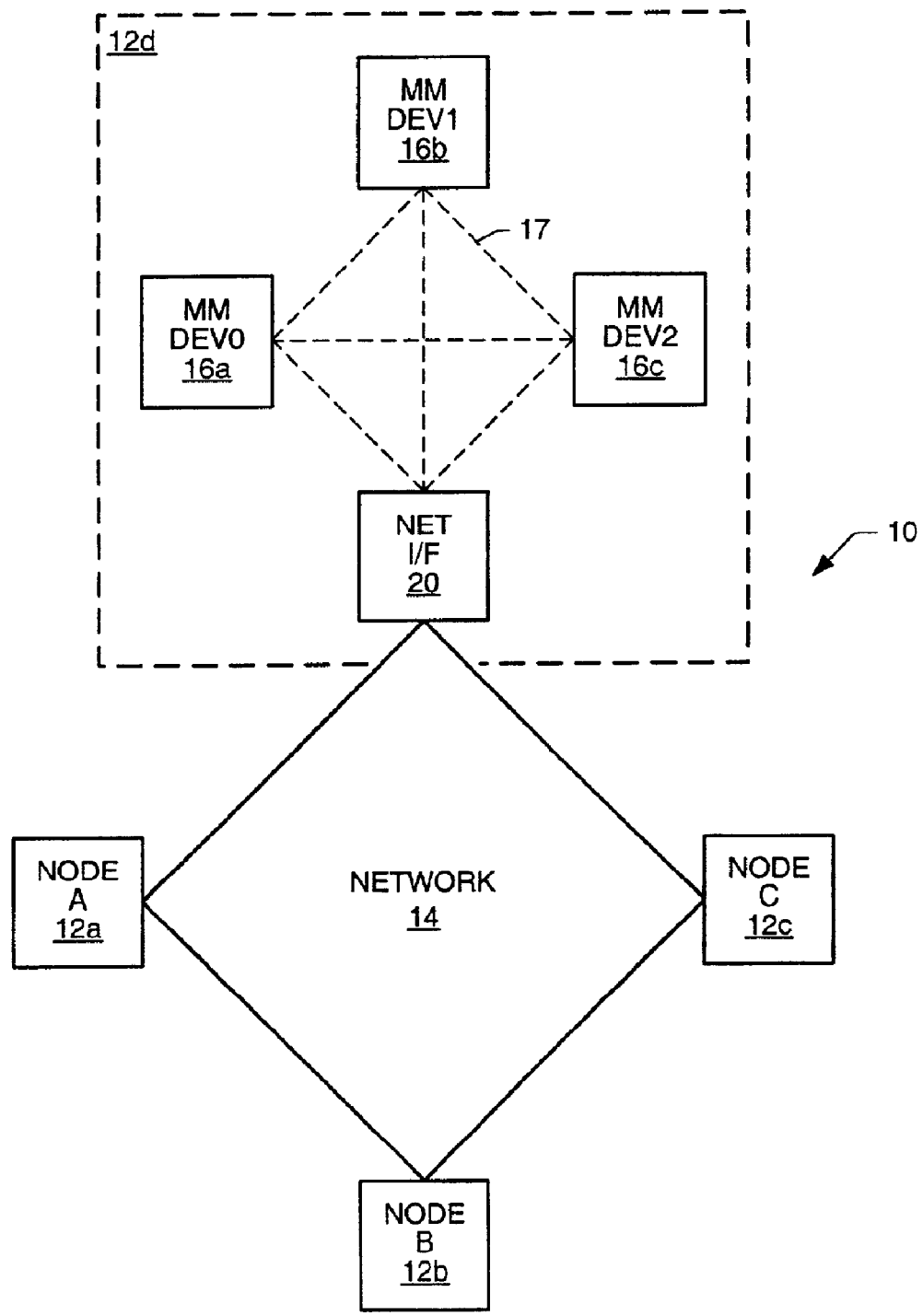
FIG. 1 is a block diagram of a communication system of interconnected nodes (network), where one or more of the nodes can accommodate a controller and one or more multimedia devices interconnected by a local bus synchronized to a clocking signal sent from, for example, the network.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates one example of a communication system 10. Communication system 10 includes an interconnected plurality of nodes 12. For sake of brevity, only four nodes are shown. However, it is understood that system 10 can include more than four nodes and can also include multiple interconnected networks. The network shown in FIG. 1 is a ring or loop. However, it is also understood that the network backbone can be bus, star, or any other topology available to a network. Coupled between nodes 12 are corresponding transmission links 14. Transmission links 14 can be optical, acoustic, or electrical (wired or wireless).

Each node 12 is preferably localized to a particular area. Within each node is at least one multimedia device. As shown in node 12d, a node can have more than one multimedia device 16. A local transmission line or local bus is shown connected between multimedia devices 16 in either a loop or bus topology as shown by the alternative phantom lines 17.

Connected between the network of interconnected nodes and local bus 17 of a particular node is a network interface 20. Interface 20 includes a communication port for transmitting communication between transmission lines 14 and local bus 17. The communication port can also be found within each of the multimedia devices 16 and, depending on its configuration, includes a clock pin, one or two signal pins, and at least one (or at least one pair of) data pins. As will be appreciated herein, the network interface function can be placed within one or more multimedia device 16 or the network interface can be separate from the multimedia devices. A multimedia device 16 can be found on a single monolithic substrate and the network interface can also be on a single monolithic substrate. Thus, the communication port can be found on, for example, a monolithic substrate of a network interface or on a monolithic substrate of a multimedia device that may or may not contain the network interface.

Preferably, network interface 20 includes a digital signal processor or controller that can be programmed, and can include a memory medium operably linked to the execution unit of the processor. Multimedia device 16, one or more of which are found within a node, is any device that can send and/or receive multimedia signals. Such signals include voice, audio, video, data files, or executable data programs. Examples of such devices include telephones, sensors, CD players, DVD players, video cameras, speakers, monitors, computers, personal digital assistants (PDAs), frequency modulated stereos, navigational systems, etc.

According to one example, the multimedia devices can be located within an automobile, and the communication system is employed within the automobile for linking the multimedia devices within a node 12 to one another or to multimedia devices within another automobile, a satellite, or a stationary base station. Depending on whether data is encrypted or encoded at the multimedia device, communication system 10 allows transfer of such information to the target as either streaming data (synchronous or isochronous), control data, or asynchronous (packetized)

data. In addition, communication system 10 can allow transfer of all four types of data across one or more channels established within communication line 14 or across local bus 17. Communication system therefore accommodates the different types of data in order to add versatility to the various types of multimedia devices which can be used.

It is recognized that one or more multimedia devices can sample data at a higher sampling rate (fs) than the frame sync rate (FSY) of transmission line 14. For example, multimedia device 16 may be a CD player than samples at approximately 44.1 KHz. The CD player can stream data at, for example, 16 bits per audio channel (32 bits per stereo channel) per sample clock period, therefore resulting in a bps Baud rate across the transmission line of 32 bits/stereo sample×44.1 k samples/second=1.4112 Mbps. The non-return to zero ("NRZ") data can be encoded in several ways. Data can also be encoded using, for example, the well known Miller encoding technique. Alternative encoding includes bi-phase encoding, or encoding so that the encoded bitstream does not incur an accumulated DC value. The latter encoding mechanism is oftentimes referred to as DC-adaptive encoding, and is described in a commonly assigned co-pending application, Ser. No. 09/710,220 entitled "An Encoder within a Communication System that Avoids Encoded DC Accumulation and can Use Coding Violations to Synchronize a Decoder and Detect Transmission Errors."

If the frame sync rate (FSR) across transmission line 14 is less than 48 KHz (e.g., FSRcould be chosen to match a CD sample rate of 44.1 KHz), then the streaming data from a 48 KHz sampled DVD player cannot be placed synchronously through transmission line 14 to another node (i.e., a speaker). Instead, the streaming data must be placed as isochronous streaming data as opposed to synchronous streaming data).

In addition to streaming data being asynchronous to the transfer rate of transmission line 14, other types of data can also be asynchronous such as, for example, packetized data or control data. In each instance, however, the various data types are fed across transmission line 14 in synchronous fashion. Communication system 10 is therefore a synchronous transmission system which accommodates dissimilar data types sampled at dissimilar frequencies or data types that are placed in non-regular, non-temporal relationship with one another.

Figure 2:
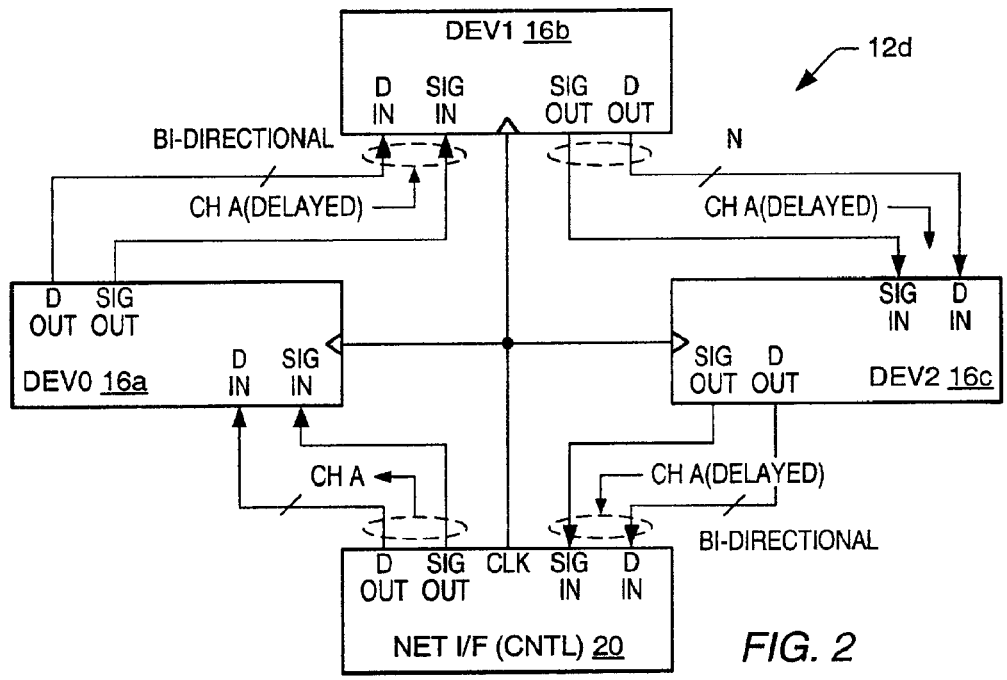
FIG. 2 is a block diagram of the controller and multimedia devices connected in a ring topology, with the controller and each device having a minimum five pin count and wherein the controller and each device is capable of bi-directional communication on a single channel.
Figure 3:
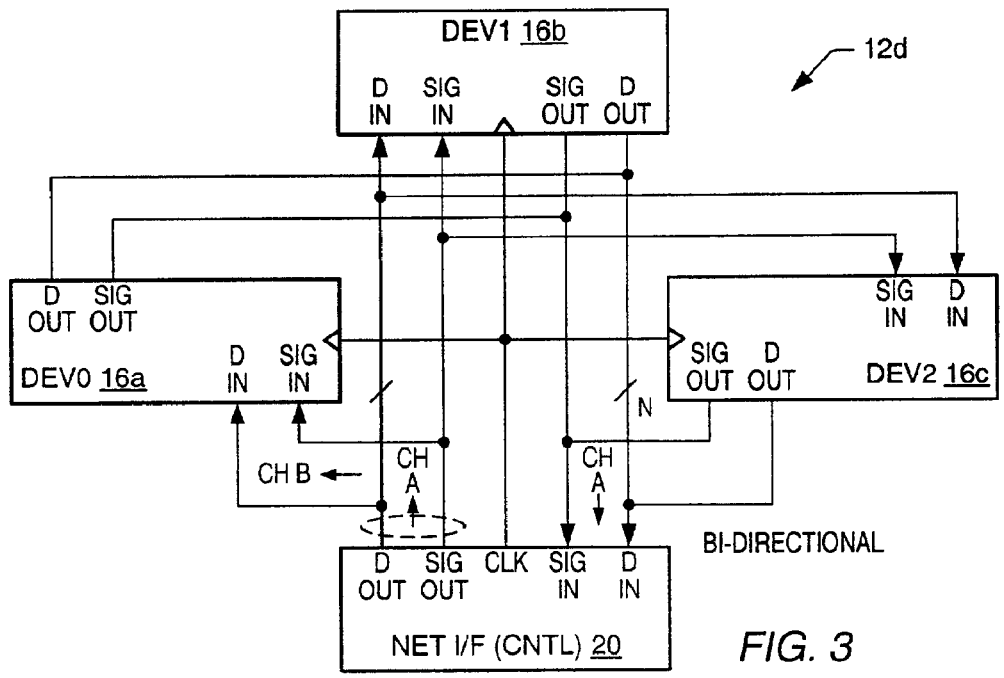
FIG. 3 is a block diagram of the controller and multimedia devices connected in a bus topology, with the controller and each of the devices having a minimum five pin count and wherein the controller is capable of bi-directional communication on a single channel to each device, and each device is capable of uni-directional communication on a single channel to another device.

Referring to FIG. 2, a ring topology is shown for node 12d. In contrast to the ring topology of FIG. 2, FIG. 3 illustrates node 12d having a bus topology. FIGS. 2 and 3 illustrate a physical layer specification for the local bus that connects network interface 20 to multimedia devices 16. In the ring topology, the devices are connected to one another by uni-directional transmission links to form a single closed loop. For example, token ring and FDDI networks implement a ring topology. The bus topology is a linear architecture in which transmission from devices propagate the length of the medium and are received by all other devices. A popular bus topology includes the Ethernet or IEEE 802.3 networks.

FIGS. 2 and 3 are presented to illustrate the relatively few pins needed on each device/controller to effectuate data transfer—whether in a ring topology or a bus topology. If only a single data conductor is used, then only five pins are needed on each device/controller: D_IN, D_OUT, SIG_IN, SIG_OUT, and CLK. The clock signal (CLK) can be mastered from any of the devices yet, preferably, is mastered from the network interface, or controller 20. Thus, controller 20 can also be clock slaved to possibly another clock master within one of the other nodes of the communication system. Controller 20 can, therefore, employ a clock recovery circuit from data sent across the network from another node, and can present the recovered clock to various devices within the local node as shown. Alternatively, controller 20 can utilize a crystal oscillator which not only provides a clock master to other devices within the node, but also possibly other nodes within the communication system.

FIG. 2 illustrates bi-directional communication that can occur on a single channel between the controller 20 and any of the devices 16, as well as between any pair of devices 16. As illustrated, channel A ("CH A") can be sent from controller 20 to a first device 16a and bypassed through device 16a to the destination device (e.g., device 16b). Output from device 16b is simply delayed as it passes through device 16b from the D_IN pin to the D_OUT pin. Channel A can continue around the loop until it is received by the destination—either the controller or another device. Thus, a ring topology allows bi-directional channel transmission between the controller and any device, as well as between any pair of devices.

The bus topology of FIG. 3 can provide bi-directional communication on a single channel between controller 20 and any device 16; however, the bus topology provides only uni-directional communication on a single channel between any pair of devices 16. While channel A can be sent from D_OUT of controller 20 to the destination device and back to the controller via D_IN in a bi-directional communication, a pair of channels is needed if communication occurs between a pair of devices. While device 16b can send channel A output from D_OUT to controller 20, the D_OUT output from controller 20 must send another channel, channel B ("CH B"), to the D_IN input of device 16a; thus, only uni-directional communication occurs between a pair of devices (16a and 16b).

Figure 4:
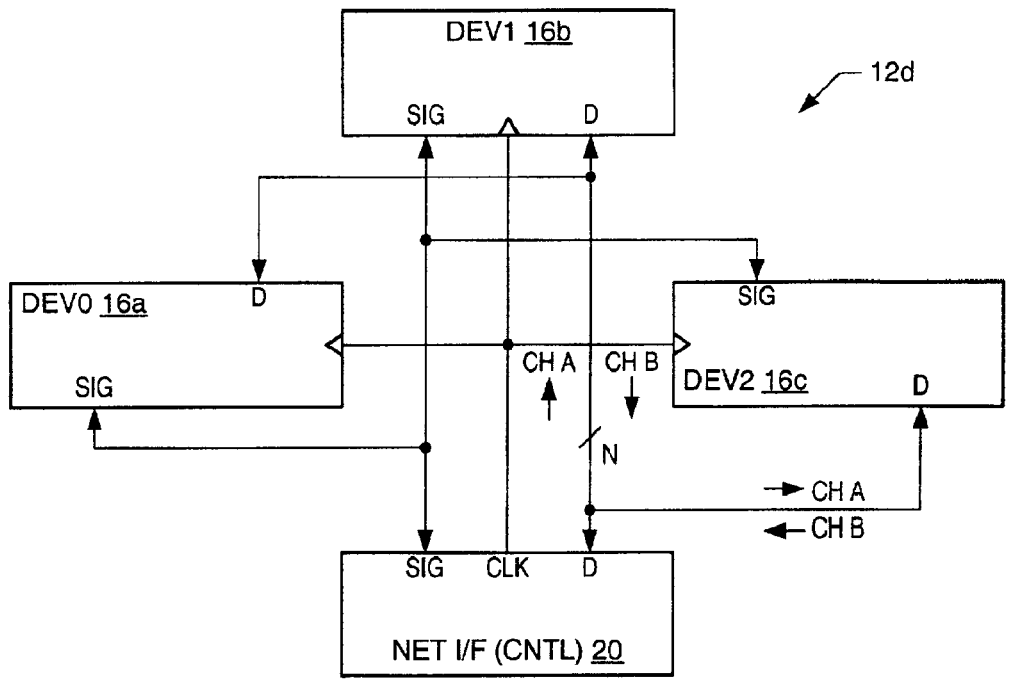
FIG. 4 is a block diagram of the controller and multimedia devices connected in a bus topology, with the controller and each device having a minimum three pins and wherein the controller and each device is capable of uni-directional communication on a single channel.

FIG. 4 illustrates an alternative local bus configuration for node 12d. As opposed to the uni-directional data and signal conductors of FIG. 3, the bus topology of FIG. 4 is shown having bi-directional data and signal conductors. Each device or controller therefore requires a minimum of only three pins: D, SIG and CLK. If more than one data conductor is needed for improved bandwidth, then more than three pins will be needed to accommodate the added data conductors.

An objective of using a network interface is to place the intelligence of the local bus transfer within the interface as opposed to placing such intelligence within the multimedia devices or the network. This allows encapsulation of the network protocol within the network interface unit using reduced pin counts and the ability to reuse legacy multimedia devices. An overall reduction in time-to-market occurs with the added benefit of backward and forward device design compatibility. The network interface allows the local bus to define a standard interface between the network interface and multiple devices, and supports inter-device communication within the node without requiring intervention by the network interface. Regardless of whether the data type is streaming data (isochronous or synchronous), packetized data, or control data, the network interface accommodates all the various types of data placed on a network which is synchronous, yet operates at a dissimilar frame sync rate than the sample rate of the streaming data. The network interface also keeps track of where, within a packet of data, the present frame of data exists. Multiple frames of data can be assured to transmit not only the full streaming data information, but also the full packetized data information.

Figure 5:
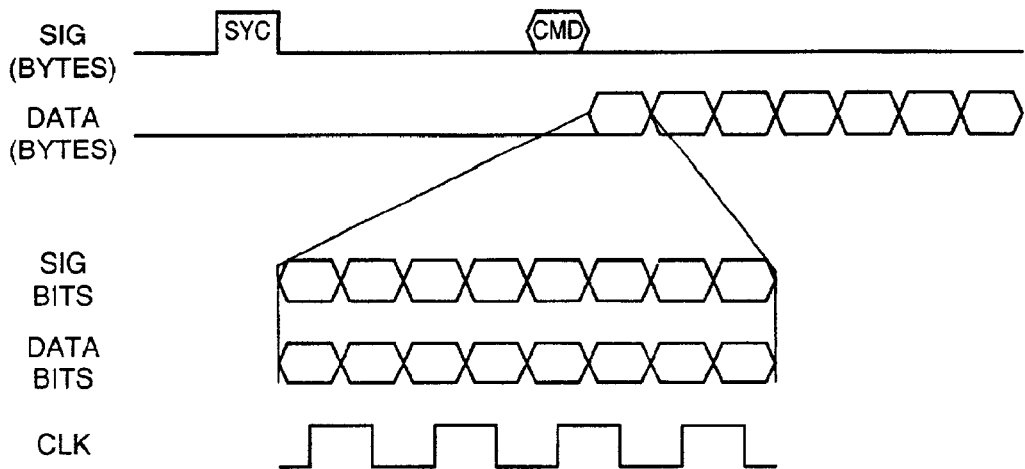
FIG. 5 is timing diagram of a clocking signal sent from a clock master (such as the controller of another node within the network) for synchronizing the transmission control, address and data bits within corresponding bytes sent across the local bus.

Regardless of whether the signal (SIG) and data (D) lines are uni-directional (FIGS. 2 and 3) or bi-directional (FIG. 4), FIG. 5 illustrates that signals placed on the signal line and the data line are synchronized to the clocking signal and, typically, are synchronized to the network. If the clock rate of the local bus is different from the network, streaming data may need to be converted to isochronous data and vice-versa. The signal codes and data codes transition in sync with transitions of the clocking signal. As noted above, the clocking signal emanates from the network or from a crystal oscillator within a node of the network and, therefore, the network interface can be and is, preferably, a fully synchronous interface—i.e., synchronized to the network and the local bus.

The clock rate is preferably equal to the Baud rate of the network. For example, if the network has a frame sync rate of 48 KHz, then the clock rate can be 1024×48 KHz, or 49.152 MHz. This is, of course, assuming 64 bytes per frame with a two-bit encoding.

While the synchronizing clock frequency within the network and the local bus can be, but is not necessarily, approximately 1024 fs, in the example provided, the frequency of the serial clock used to transmit serialized multimedia device information is substantially lower (e.g., 128 fs). This affords, for example, streaming data from a device to be partitioned among successive frames sent across the local bus as well as across the network. For example, 8 bytes of a 64-byte frame can be dedicated to channel A, separate and apart from possibly another 8 bytes of that frame dedicated to channel B, and so forth. Channel A can be used to send isochronous data, for example, and channel B can be used to send packetized data, for example. Thus, within each frame, time slots can be used and allocated to send different types of data.

As shown in FIG. 5, a sync ("SYC") byte is used to demarcate bytes and frames of data. The sync byte occurs at the beginning of each frame. The first time slot within a frame subsequent to a sync byte can be allocated to sending a certain type of data separate and distinct from a subsequent time slot dedicated to a different type of data, and so forth for each time slot of each corresponding frame.

Occurring subsequent to each sync byte can be a command ("CMD") byte. Unlike streaming data which picks up where the last streaming data left off in the previous frame, packetized data does not have a temporal relationship and, therefore, one does not know where, within a packet, the previous frame left off. As such, the command byte signals that the previous packet must be resumed or, if a new packet is ready for transmission, that the start of new packet occurs. The command byte is, therefore, used to signify the beginning of a packet of data sent within a particular time slot or a continuation of a previous packet of data in that time slot. Further details of the command byte will be provided below.

Figure 6:
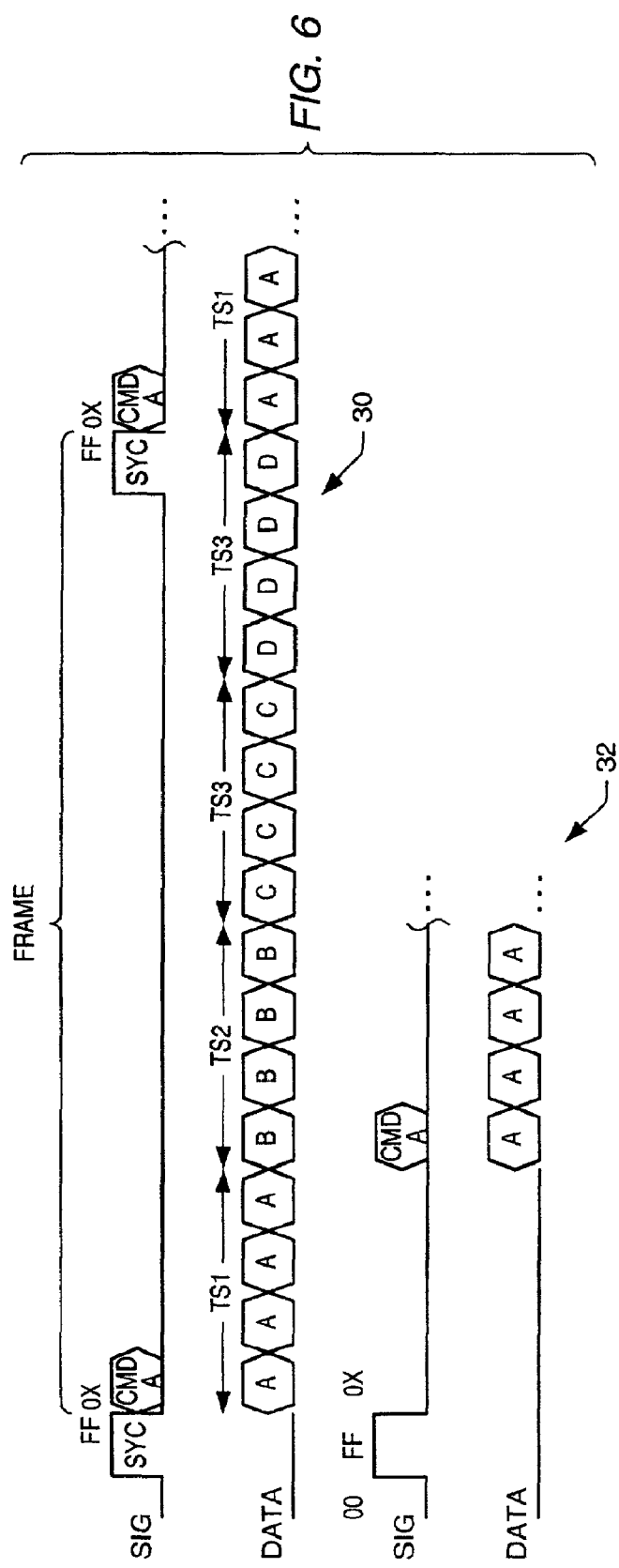
FIG. 6 is a timing diagram of a set of channels time-multiplexed across a frame with one of the channels comprising data signified with a command byte.

FIG. 6 illustrates one example by which four time slots, TS1, TS2, TS3, and TS4, are attributable to each frame. The initiation of time slot partitions within a frame are signaled by a unique code of the sync signal. The sync signal can be an entire byte and, if so, is coded hexadecimal FF which translates to a binary 11111111. A command byte can be placed between successive sync bytes at the beginning of a particular time slot. In the example shown, command A ("CMD A") is placed at the beginning of time slot 1 corresponding to the first byte of data A. If desired, command A can be placed at the beginning of the first time slot or at the beginning of the second time slot, third time slot, etc. If placed at the beginning of the first time slot, then it is noted that a 0XXX XXXX binary code allows for a sync byte to be readily decoded as having eight 1s followed by a 0, where 0 is the MSB of the command byte. Using eight 1s for a sync byte and a 0 in the MSB locations of a command byte affords rapid decoding of the sync byte to indicate data A must be sent by the source device immediately upon receiving from the controller the last 1 in the LSB location. Using a unique bit pattern for the sync byte allows quick detection and demarcation by the source device at frame boundaries.

As shown by timing diagram 30, the data associated with TS1–4 (i.e., channel A–channel D), is a minimum of 4 bytes long for each time slot or channel. However, it is understood that the minimum channel length can be as short as 1 byte long and that a frame can be fewer than 16 bytes (as shown) or greater than 16 bytes long. Only for ease of illustration and brevity in the drawing, timing diagram 30 shows a 16-byte frame with time slots (or channels), each being 4 bytes long.

Timing diagram 32 illustrates that the command signal (or byte) need not occur within the first byte location of the first time slot. Instead, the command signal can be sent on the signal line coincident with the first byte location of the second time slot or, for that matter, the first byte location of the third, fourth, etc. time slot. A minimum of one command signal is sent per frame if a time slot is to be dedicated to sending packetized data. Timing diagram 32 is merely an example illustrating that the command for the start of a packet or the continuation of a packet can occur at the beginning of the second time slot, instead of the first time slot as in timing diagram 30.

The data transfer protocol of FIG. 6 is applicable to uni-directional or bi-directional data/signal signal lines. Thus, the transfer protocol is applicable to a minimum three-pin device or a five-pin device (see FIGS. 2–4). In a bus topology, after the source device transmits a particular channel, however, the source device must tri-state its output. Outputs are tri-stated so as not to effect the transmission of another device.

A message can be sourced from the network or not from the network (i.e., from a device on the local bus that is not the controller). Regardless, the controller transmits the sync signal on the signal line to set up the time slots and channels for each frame. If a device is transmitting the message, then the device will transmit the command byte designating non-streaming data within a time slot having the command byte. The source device also sends the data bytes in that time slot. If a uni-directional bus is used, then the source device will send command and data on that device's SIG_OUT and DATA_OUT pins to the corresponding SIG_IN and DATA_IN pins of the controller some fixed delay after the pipeline delay on the local bus. If the data and signal lines are bi-directional, then the source device merely sends the command and data on the SIG and D pins to the controller's SIG and D pins.

Figure 7:
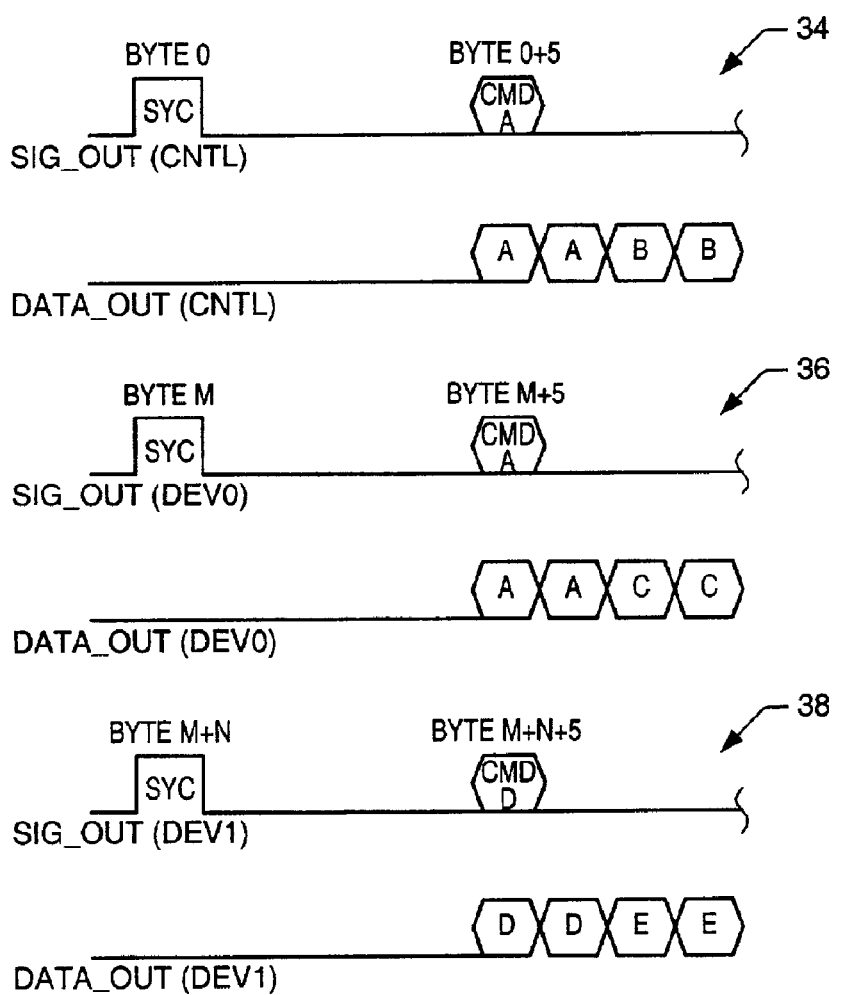
FIG. 7 is a timing diagram of a set of channels forwarded to, through and from corresponding devices connected to one another via a local bus ring topology.

FIG. 7 illustrates data transfer protocol in a ring topology. In particular, FIG. 7 illustrates a timing diagram of a ring topology utilizing unidirectional buses arranged according to the topology of FIG. 2. Data is sent around the ring across a single channel between a controller 20 and any of the devices 16, as well as between pairs of devices 16. Thus, controller 20 can send a sync byte in byte location BYTE0 and, after a pipeline delay, the source device (i.e., the controller in this example) sends a first time slot of data which might be channel A, followed by channel B, etc., the pipeline delay might be 4 bytes in length, as shown in the example of timing diagram labeled 34. However, the pipeline could be more or less than 4 bytes. Along with SIG_OUT sent from the controller source, DATA_OUT is sent corresponding to the various time slots within the frame initialized at byte location BYTE0.

After some time delay within device 0, noted as M, the sync byte is retransmitted by device 0. The process of forwarding a channel about the ring will continue, taking into account various delays within certain devices. It is noted that the timing diagram of the SIG_OUT and DATA_OUT pins of device 0, labeled 36, can accommodate data altogether different from the data sent from the controller, as indicated by timing diagram 36. Thus, the controller can send multiple channels from its DATA_OUT pin, and each device can also send multiple channels of different data from their DATA_OUT pins. The channels are merely passageways through which particular types of data are sent.

Timing diagram 38 indicates that the data of channel A may be destined for device 1, yet device 1 sends new data within the first time slot other than data of channel A—i.e., the new data being DATA D. Thus, timing diagram 38 indicates another delay of N. In fact, device 1 produces channel D and E having different data in time slots 0 and 1. Therefore, timing diagram 34 illustrates communication from the controller; timing diagram 36 illustrates communication from device 1; and timing diagram 38 indicates communication from device 2. While command A may indicate a start of packet command, command D may indicate a continuation of packet command. Thus, data A might be packetized data and, particularly, the beginning of the packetized data, while data D may also be packetized data.

In the example shown in FIG. 7, data A is non-streaming data transmitted by the controller to the first device within the ring. It is appreciated, upon reviewing timing diagrams 34, 36, and 38, that in a uni-directional local bus architecture, the output from the SIG_OUT and DATA_OUT pins of a given device or controller are apportioned into channels according to time slots, with a particular data type applied to each time slot within each frame. Data within a channel of a particular time slot not used by a device can be retransmitted to the subsequent device on the ring.

During initialization, the controller and devices either must know in firmware which time slots to assign to the control channels, isochronous channels, synchronous channels, and packetized channels sent from the various devices or controller, or the controller must write this information into each device using the sync and broadcast channels. In response to a broadcast messages, the controller will then know how many devices are connected and the address of each channel. The controller can then send messages embedding each channel address into the message to each device to specify which time slots to use. Once this information is loaded into each device, the controller can then read from each device. If a ring topology is used, the last device in the ring from the controller can communicate back to the controller on the sync and broadcast channels.

Figure 8:
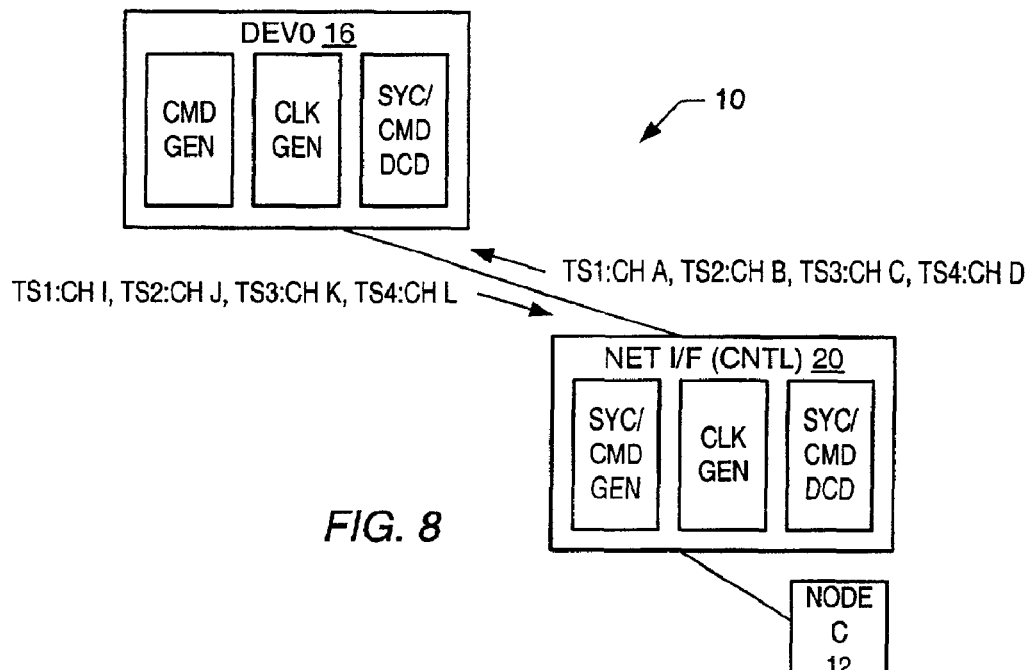
FIG. 8 is a block diagram of the channels formed between a device and the controller, and the time sequence used to establish channels for communication between the device and the controller whereby a channel can convey a respective type of data dissimilar from one or more of the other channels according to the example of FIG. 6.

FIG. 8 illustrates communication system 10 and, particularly, network interface 20 linked between a network having node 12 and a local bus having a multimedia device 16. Time slots 1–4 are illustrative of channels A–D sent from network interface to device 16. One or more of the channels forwarded within the frame may require a command byte sent within a signal line. Accordingly, controller 20 can be a source and device 16 can be a destination. Conversely, device 16 can be a source and network controller 20 can be a destination if channel I-L are forwarded, as shown.

The network and local bus are synchronized with a clock, generated either by controller 20 or device 16. Sync byte is generated from controller 20 and command bytes can be sent from the source device, such as controller 20 or device 16. It is important that the destination device (whether destination device is device 16 or controller 20) receive and decode the sync byte and command byte to know where the bytes and frames begin. Since each time slot is pre-defined, the sync byte essentially operates as a byte-to-byte synchronizer. The command byte is also synchronized to the sync byte.

Figure 9:
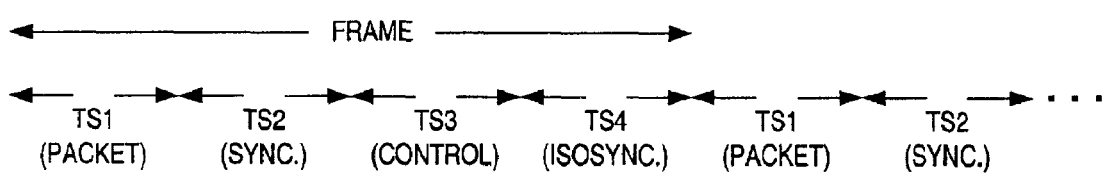
FIG. 9 is a timing diagram showing multiple types of data sent across possibly four channels within a frame, with the frame repeating every sync signal forwarded across the signal conductor.

FIG. 9 illustrates the various data types that can be sent within the frame and apportioned to various time slots: TS1–TS4. While the example shows four time slots, it is important to note that each frame can be apportioned into more than four time slots or less than four time slots depending on the number of data types being sent within a frame, the frame size, the channel length, and so forth. For example, two time slots can be attributed to synchronous data and less than one time slot can be attributed to packetized data if, indeed, TCP/IP data is not destined for the local bus and more streaming data is present.

Figure 10:
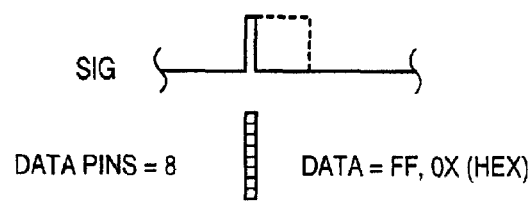
FIG. 10 is a timing diagram of placing a code on the data line synchronized to a sync pulse to signify the beginning of a channel address or frame initiation rather than placing the code upon the signal line as an entire byte in order to lessen signal line bandwidth requirements.
Figure 10:

FIG. 10 illustrates an option by which the sync byte or command byte can be represented as a single bit pulse. If the number of data pins is equal to 8, then 8 bits can be sent at the same time in which a single signal pulse is sent. The 8 data lines can be encoded in any fashion to signify frame boundaries. The single sync pulse is thereby used to signify byte boundaries. The eight data lines, therefore, do not need to be coded as FF hex with the next bit being a 0. This allows the data pins to signify the sync byte and/or the command byte synchronized to a single signal pulse, all achievable within a single clock cycle within the local bus.

If the data pins are equal to 4, rather than 8, then a pulse two clocks wide is needed to forward the encoded sync and command bytes and, if the number of data pins are 2, then a pulse four clocks wide is needed. This method enables smaller channels to be used than the normal approach. With eight data lines and 2 bytes on the signal line for address and command, the minimum addressable channel is 16 bytes with the normal approach. With this alternative approach, with any number of data lines, the minimum channel is 2 bytes.

The physical layer specification for the local bus is shown implemented as bi-directional and uni-directional conductors. Optimally, a bi-directional bus is used to minimize pin count for each device and controller. While conventional serial buses can be used to support multiple data stream or data types, the I²S bus defined by Phillips Corporation and the Audio Codec bus defined by Intel Corporation typically require an additional port on the controller to accommodate additional devices. This will significantly enhance the pin count on the controller and the overall complexity of the bus and ring topology. Using time slots and a local bus with minimal pin count per device and controller is, therefore, advantageous since, in fact, many digital signal processors are able to implement ring communication on-chip.

While the local bus clock synchronizes command, sync, and data transfers across the local bus, it is recognized that the local clock can be variable. Moreover, the local clock may be and is, preferably, synchronized to the network clock. The data throughput of the local bus is, however, scalable depending upon the number of data lines used. If only a single data line is used, then the data throughput can be, for example, 1024 fs (i.e., 49.152 MHz at 48 KHz network frequency) if a 1024 fs clock is used. However, if 8 pins are used, then instead of a 49.152 Mbps, data throughput of the local bus can be 49.152 Mbps×8, or 393.216 Mbps, for example.

The pipeline delay is at least one channel length and can be multiples of one channel length, the minimum channel length being 2 bytes. The reserved channel address of hexadecimal FF will be used by the controller as a broadcast channel to periodically sync the time slots. It is desired that the broadcast channel occur once for each frame.

Figure 11:
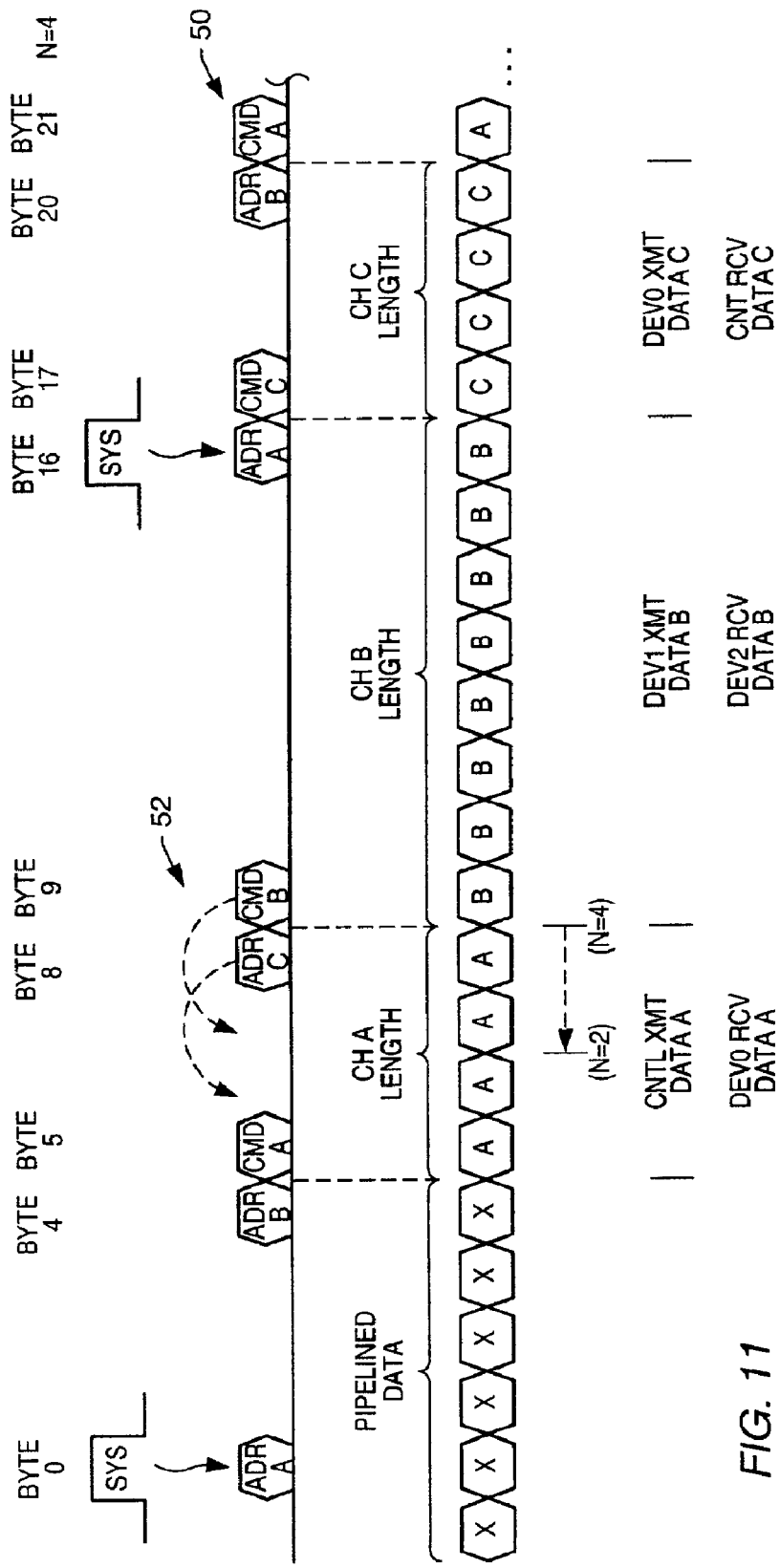
FIG. 11 is a timing diagram of channels established upon the local bus, wherein each channel is established by an addressing signal sent on a signal conductor, and wherein a unique data type can be established by a command signal also sent on the signal conductor.
Figure 12:
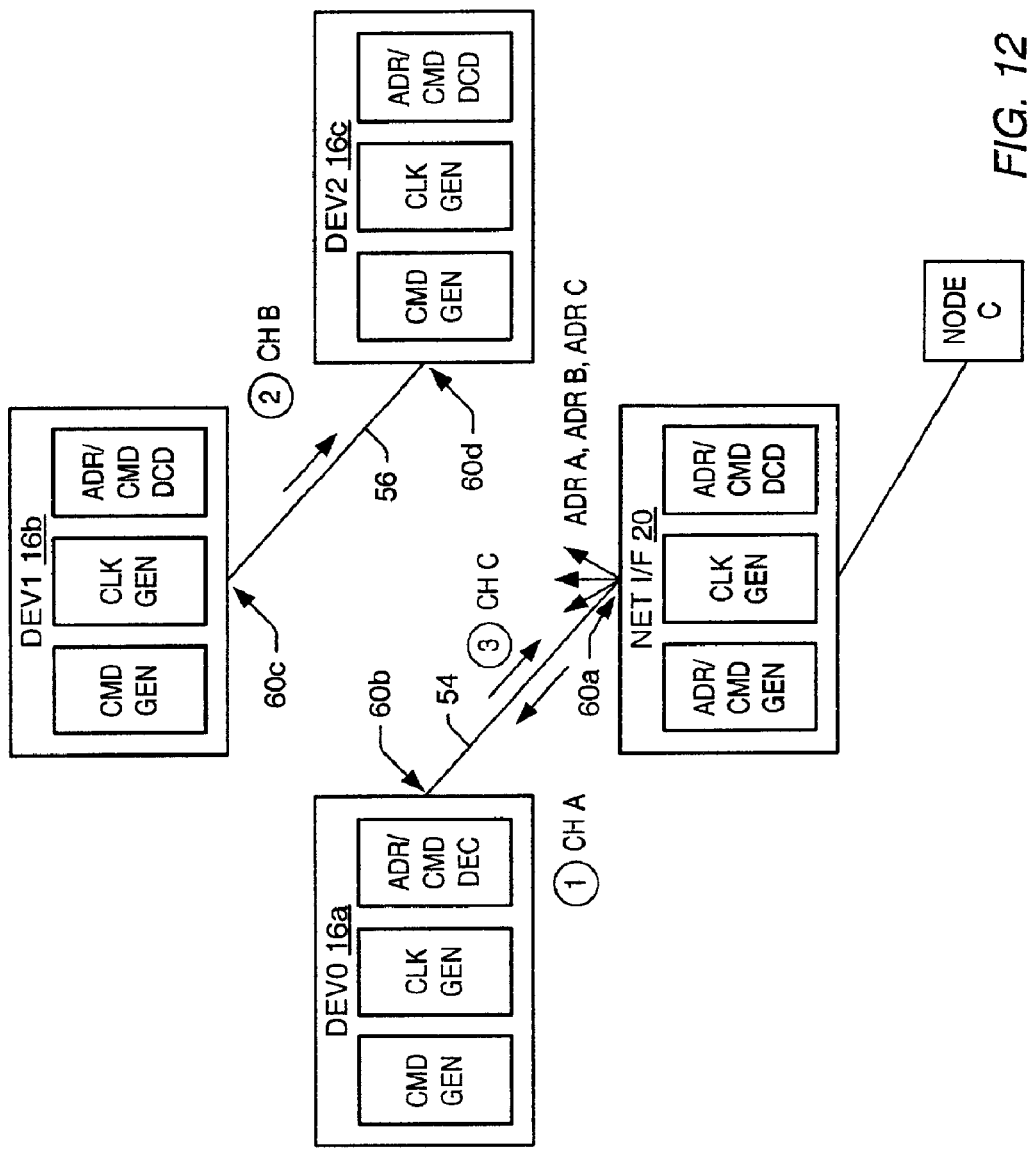
FIG. 12 is a block diagram of the channels formed between the controller and a multimedia device as well as between multimedia devices, and the timing of data subsequently sent across those channels in accordance with the address and control protocol example shown in FIG. 11.

FIGS. 11–13 illustrate an alternative embodiment from that described in FIGS. 6–10. Using the second embodiment, regimented time slots need not be used and, in lieu of time slots, an addressing protocol can be established to form the corresponding channels. Thus, FIGS. 11–13 illustrate the benefit of not being tied to sending a particular data type within a first time slot and another data type within a second time slot across multiple frames being transmitted. The added flexibility of being able to designate a particular data type based on an addressing protocol, rather than in a fixed time slot location, allows data to be transferred possibly more efficiently provided, of course, a channel is established to send streaming data for each frame during times in which the streaming data is being sampled in real time. Non-streaming data, such as packetized or control data, need not be sent in each and every frame. This allows multimedia device transfers which operate predominantly on streaming data to allocate more channels within a frame to sending such data without having to be burdened by allocating time slots for packetized data when no packets are available for transmission.

Using an addressing protocol, which will be described below, provides the best data transfer performance and bandwidth allocation. Channel addressing and data transfer protocol described in FIGS. 11–13 can be used with bi-directional conductors or uni-directional conductors of the local bus, in a bus topology or a ring topology, similar to time slot allocation. Other than for flexibility of transferring a data type on a channel-by-channel basis, all other features of time slot allocation are also present within the channel addressing embodiment hereof.

Turning now to FIG. 11, a timing diagram 50 is shown illustrating dynamic channel assignment and resource allocation. A sync signal is forwarded across the signal conductor from the controller as a broadcast address A, in the example of FIG. 11. Address A is shown forwarded from the controller as the broadcast channel. Assuming timing diagram 50 does not depict initialization, then data will be present from the previously addressed channel upon the data conductors. That data is known as the pipeline data, indicated with a number "X" bytes. The pipeline duration is one channel in length and can vary from frame to frame. In the timing diagram 50 example, the pipeline byte width is 4 bytes.

Once the controller asserts the next address (i.e., address B), the source device knows to terminate its transmission, and the previously addressed source device will send a command signal (i.e., command A). The command signal indicates the type of data being sent within a channel established by the previous address A (i.e., broadcast channel A). Channel A will continue for a duration determined by the next address asserted by the controller (i.e., address C). Similar to address B, address C is broadcast by the controller to each of the devices and the source device which transmits channel A will know to terminate its transfer in readiness for the next channel established by the preceding address B (i.e., channel B).

The procedure by which addresses and commands are sent on a signal line and data is sent on one or more data lines, is coordinated by the intelligent controller. That is, the controller will establish through the address the source device and the destination device (which can include the controller itself). The controller will also establish the duration of a channel as the number of bytes between a subsequent pair of addresses. A controller can, for example, send a minimum channel length between a pair of devices by asserting the next address early, or delaying the next address to send possibly a channel length which is a multiple of the minimum channel length. The added flexibility of sending more data of a particular type becomes prevalent if, however, a long duration of streaming data occurs on the network which must be forwarded to its destination on a local bus via a controller. The same can be said if a long duration of packetized data exists in a lengthy burst. Provided, of course, allocation is made in a frame to transmit streaming data (if present), the packetized data could extend multiples of the minimum channel length.

The controller has sufficient intelligence to know when various types of data are present and must be transferred. In particular, the controller knows that streaming data must be transferred in real time and, thereby, reserves one or more channels within each frame for sending isochronous streaming data and/or synchronous streaming data.

FIG. 11 illustrates a frame width of 16 bytes. The first channel extends from the previous frame as pipeline data, followed by channel A having a 4 byte width, and followed by channel B having an 8 byte width. The frame can also be thought of as possibly beginning on byte 4 and ending on byte 20, whereby the first channel established in that frame is channel A, followed by channel B, and finally channel C. The minimum channel length is at least 2 (i.e., N represents the channel length and N is shown in FIG. 11 as equal to 4). However, if address C and command B are moved up 2 byte lengths, then channel A length would only be 2 bytes long before address C occurs and command B is initiated. Reference 52 illustrates the formation of a minimum channel length of N=2, rather than N=4.

FIG. 11 also illustrates that the various channels are established for transmitting a certain length of data from a unique source to a unique destination. For example, the data in channel A can be transmitted from a controller source to a device 0, whereas data in channel B is sent from device 1 to device 2, and data in channel C is shown to be sent from device 0 to the controller. Further details of how channels are established and the effect of those channels as transmission paths are provided in FIG. 12.

FIG. 12 illustrates communication pathways 54 and 56 established within a local bus. The pathways are established through communication ports 60 found on the network interface and/or one or more of the multimedia devices. The communication port on the controller transmits sync and addressing signals, and the communication port on the devices (absent a controller) transmits primarily command signals. The local bus can be any type of topology, including a bus topology or a ring topology. Channel A is established by broadcasting an address ("ADR A") from controller 20 to each of the devices linked to the local bus. After a pipeline delay, controller 20 then forwards address B ("ADR B") to each of the devices. Transmission of address B indicates that the previous data transmission must be terminated and the source device for address A must begin its transmission by sending command A to the destination device. In this case, the source device is controller 20 which sends command A and the ensuing data within channel A to the addressed destination device 0. Channel A is maintained until controller 20 sends the next address which, using this example, is address C broadcast to each of the devices. Upon receiving address C, the source device which received address B sends its command signal to initiate channel B from source device 1 to destination device 2. Channel B is discontinued with the broadcast of the next address, which is address A sent from controller 20, followed by command C of the source device of that address. In this example, the source device is device 0 which sends data within channel C to controller 20.

The above example used to illustrate the data transfer protocol is merely an example of possibly numerous permutations depending on numerous factors. For example, there could be more than three devices and, certainly, more than or fewer than three channels having a minimum channel length of 2 bytes, 4 bytes, or each channel having a duration exceeding one minimum channel length, for example.

FIG. 13 illustrates, using the example of FIGS. 11–12, addresses for channel addresses A, B, and C. Thus address A can designate the controller as the source and device 0 as the destination, whereas address B can designate device 1 as the source and device 2 as the destination, and so forth. Each address defines a unique source and destination pair and the duration of the data transfer is the time difference between addresses. Moreover, the type of data being transferred is designated by the command.

An exemplary address and command descriptor tables are shown in FIG. 14. The channel addresses are 8-bit addresses with hexadecimal FF reserved to be the sync pattern and broadcast address. In order to guarantee there are no occurrence of the sync pattern, address hexadecimal 80 to hexadecimal FE are reserved also. Therefore, there are 127 unique channel addresses available to be used by an application on the local bus. A command is also a byte, with hexadecimal 80 to hexadecimal FF reserved to guarantee that there will be no occurrence of the sync pattern. In addition, the MSB of the command will always be 0 and can be used as an error detection scheme. The command structure allows the local bus devices to indicate the type of data being placed on the local bus. All the various data types are supported from decimal 1–9 to note that control data, packet data, isochronous data, and synchronous data can be labeled as a start or continuation command depending on whether the present channel is sending the first byte of those data types, or is sending a continuation byte of those data types.

Thus, addresses are tokens which are presented on the signal line by the controller to notify the transmit device and the receive device that the local bus is free and ready for the addressed channel. A command is a token response by the source device to notify the destination device of the data type and other control information, such as ERROR, RESET, ECHO, and NO DATA. Both the controller and the destination device are required to examine the command sent by the source device. The controller will examine the command to monitor for an ERROR code or a NO DATA code. Upon receiving the error code or no data code, the controller will terminate the transfer and no further bandwidth will be wasted. Upon receiving either the ERROR code or NO DATA code, the destination device will ignore the data received. At the time in which the source device responds to the address byte on the signal line, the source device also drives the data on the data line synchronously to the local bus clock. The destination device will clock in the data on the local bus data line synchronously. The message is complete by the controller sending the next channel address on the signal line. The source device will stop transmitting and tri-state the data line immediately after the change of channel address (for a bus topology) is detected and the destination device will stop clocking in the data at the same time.

The sync pattern of hexadecimal FF can be used not only to sync frame boundaries, but also byte boundaries and is used as a broadcast channel for the controller so that information such as channel address table or time slots can be updated by using the broadcast channel periodically.

Numerous variations and modifications will become apparent to those skilled in the art once the above disclosure is fully appreciated. It is intended that the following claims be interpreted to embrace all such variations and modifications.

What is claimed is:

1. A port, comprising:
   a data pin adapted to receive a frame comprising a first set of bytes time-division multiplexed with a second set of bytes, wherein the first set of bytes comprise packet data; and
   a signal pin adapted to receive a sync signal followed by a command signal, wherein the sync signal indicates a boundary of said frame and said command signal occurs at approximately the same time as the first set of bytes for indicating a start of the packet data.

2. The port as recited in claim 1, wherein the first set of bytes occur within the frame before the second set of bytes.

3. The port as recited in claim 1, wherein the first set of bytes occur within the frame after the second set of bytes.

4. The port as recited in claim 1, wherein the command signal occurs at approximately the same time as a first byte within the first set of bytes.

5. The port as recited in claim 1, wherein the command signal comprises a code of eight bits with a logic low voltage value in the most significant bit location.

6. The port as recited in claim 1, wherein the sync signal comprises a code of hexadecimal FF.

7. The port as recited in claim 1, further comprising a plurality of devices connected by the bus in a ring or bus topology.

8. The port as recited in claim 1, wherein the signal pin and the data pin are embodied on a monolithic substrate.

9. The port as recited in claim 1, wherein the signal pin and the data pin are embodied on a network interface configured between a bus and a network.

10. The port as recited in claim 1, wherein the signal pin and the data pin are embodied upon a multimedia device configured to receive the first set of bytes.

11. The port as recited in claim 1, further comprising N data pins, where the sync signal comprises a pulse synchronized by a clock signal, wherein the sync signal is sent across the signal pin contemporaneous with M coded bits sent across the N data pins to signal the start of a frame of data.

12. The port as recited in claim 11, wherein M equals eight.

13. The port as recited in claim 1, further comprising N data pins, where the command signal comprises a pulse synchronized by a clock signal, wherein the command signal is sent across the signal pin contemporaneous with M coded bits sent across the N data pins to signal the start of a packet of data.

14. The port as recited in claim 13, wherein M equals eight.

15. A communication system, comprising:
- a network interface, comprising:
  - a data pin configured to send a frame of data partitioned according to timeslots;
  - a signal pin coupled to a generator for sending a sync code followed by a command code;
- a multimedia device, comprising:
  - a data pin configured to receive the frame of data; and
  - a signal pin coupled to a decoder for receiving the sync code and the command code and for decoding the sync code to signify the beginning of the frame and for decoding the command code to signify the beginning of a data type within one of the data partitions.

16. The communication system as recited in claim 15, wherein the data type within one of the data partitions is packetized data.

17. The communication system as recited in claim 15, wherein the data type within another one of the data partitions is streaming data.

18. The communication system as recited in claim 15, wherein the data pin on the network interface and the data pin on the multi-media device are connected by a conductor across which bi-directional communication occurs.

19. The communication system as recited in claim 15, wherein the data pin on the network interface and the data pin on the multi-media device are connected by a conductor across on which uni-directional communication occurs.

20. The communication system as recited in claim 15, wherein the sync code comprises a byte of hexadecimal FF, and wherein the command code comprises a byte having a logic low voltage value at the most significant bit location.

21. The communication system as recited in claim 15, wherein the sync code comprises a byte length of logic high voltage values followed, exclusive of the sync code by a logic low voltage value.

22. A network interface, comprising:
- a signal pin adapted for sending a sync signal followed by a command signal; and
- at least one data pin adapted for sending at least one byte of a first series of bytes of data across a first channel followed by at least one byte of a second series of bytes of data across a second channel, wherein the first and second channels occur in time-divisional multiplexed sequence after the sync signal is sent, and wherein the first channel occurs contemporaneous with the command signal.

23. The network interface as recited in claim 22, wherein the sync signal comprises a byte of information coded to signal the start of a frame of data comprising at least the first and second series of bytes.

24. The network interface as recited in claim 22, further comprising N data pins, where the sync signal comprises a pulse synchronized by a clock signal sent from the network interface, wherein the sync signal is sent across the signal pin contemporaneous with M coded bits sent across the N data pins to signal the start of a frame of data.

25. The network interface as recited in claim 22, wherein M equals eight.

26. The network interface as recited in claim 22, further comprising N data pins, where the command signal comprises a pulse synchronized by a clock signal sent from the network interface, wherein the command signal is sent across the signal pin contemporaneous with M coded bits sent across the N data pins to signal the start of a packet of data.

27. The network interface as recited in claim 26, wherein M equals eight.

28. The network interface as recited in claim 22, wherein the command signal comprises a code having a logic low voltage value at the most significant bit location.

29. The network interface as recited in claim 22, wherein the sync signal comprises a code of hexadecimal FF.

30. The network interface as recited in claim 22, further comprising a clock pin adapted to send a clock, and wherein the sync signal, command signal and the first and second series of bytes are synchronized to the clock.

31. A method for transmitting data, comprising:
- receiving a frame of data sent from a network of interconnected multimedia devices;
- partitioning the frame of data into timeslots;
- forwarding the partitioned data into respective plurality of channels selected according to time-divisional multiplexing;
- signaling the start of a first channel within the plurality of channels with a start of frame byte; and
- signaling the start of a packet of data within one of the plurality of channels with a start of packet byte.

* * * * *